(12) United States Patent
Watanabe et al.

(10) Patent No.: US 11,959,769 B2
(45) Date of Patent: Apr. 16, 2024

(54) INFORMATION PROCESSING DEVICE THAT GENERATES BOUNDARY LOCATION INFORMATION OF A ROAD ON WHICH A VEHICLE TRAVELS BY AUTOMATED DRIVING

(71) Applicant: Mitsubishi Electric Corporation, Tokyo (JP)

(72) Inventors: Masashi Watanabe, Tokyo (JP); Yukako Takahashi, Tokyo (JP); Takuma Kadoya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 559 days.

(21) Appl. No.: 17/273,316

(22) PCT Filed: Oct. 1, 2019

(86) PCT No.: PCT/JP2019/038667
§ 371 (c)(1),
(2) Date: Mar. 4, 2021

(87) PCT Pub. No.: WO2020/080088
PCT Pub. Date: Apr. 23, 2020

(65) Prior Publication Data
US 2021/0247771 A1    Aug. 12, 2021

(30) Foreign Application Priority Data

Oct. 15, 2018   (JP) ................. 2018-193957

(51) Int. Cl.
*G01C 21/00*    (2006.01)
(52) U.S. Cl.
CPC ..... *G01C 21/3837* (2020.08); *G01C 21/3815* (2020.08)

(58) Field of Classification Search
None
See application file for complete search history.

(56) References Cited

U.S. PATENT DOCUMENTS

2012/0128207 A1   5/2012  Manabe et al.
2016/0180177 A1*  6/2016  Nguyen ............. G06V 10/42
                                              382/104
(Continued)

FOREIGN PATENT DOCUMENTS

JP   2012-37490 A   2/2012
JP   2017-78904 A   4/2017
(Continued)

OTHER PUBLICATIONS

Wang et al., "Road Boundaries Detection Based on Local Normal Saliency From Mobile Laser Scanning Data", IEEE Geoscience and Remote Sensing Letters, vol. 12, No. 10, Oct. 2015 (Year: 2015).*

(Continued)

*Primary Examiner* — Amelia Vorce
(74) *Attorney, Agent, or Firm* — XSENSUS LLP

(57) ABSTRACT

An information processing device includes processing circuitry configured to acquire feature measurement information indicating locations of features including a road having a boundary and trajectory information indicating a trajectory along the road. Additionally, the processing circuitry is further configured to generate candidate location information indicating locations of candidate elements for the boundary, based on the acquired feature measurement information. Further, the processing circuitry is configured to select candidate elements from among the candidate elements indicated by the generated candidate location information, based on the acquired trajectory information. Finally, the processing circuitry is configured to generate (Continued)

boundary location information indicating determined locations of the boundary, using the selected candidate elements.

10 Claims, 14 Drawing Sheets

(56) References Cited

U.S. PATENT DOCUMENTS

| | | |
|---|---|---|
| 2017/0116477 A1 | 4/2017 | Chen et al. |
| 2018/0172455 A1* | 6/2018 | Yamaguchi ......... G01C 21/005 |
| 2018/0204074 A1* | 7/2018 | Kumano ................ G06V 10/44 |
| 2019/0265046 A1* | 8/2019 | Agarwal ............... G01S 7/4808 |
| 2020/0103234 A1* | 4/2020 | Fujiya ................. G01C 21/3804 |
| 2020/0111216 A1* | 4/2020 | Eade ...................... G06F 16/284 |
| 2021/0033406 A1 | 2/2021 | Watanabe et al. |
| 2021/0049375 A1* | 2/2021 | Oyama ................ G08G 1/0129 |
| 2021/0362741 A1* | 11/2021 | Han .................... B60W 60/001 |
| 2022/0277163 A1* | 9/2022 | Stenneth ................... G06T 7/12 |
| 2023/0071794 A1* | 3/2023 | Shim ..................... G06V 20/588 |

FOREIGN PATENT DOCUMENTS

| | | |
|---|---|---|
| JP | 2017-223511 A | 12/2017 |
| WO | 2019/239477 A1 | 12/2019 |

OTHER PUBLICATIONS

Partial Supplementary European Search Report dated Mar. 25, 2022 in European Patent Application No. 19874002.9, 13 pages.
International Search Report and Written Opinion dated Dec. 24, 2019, received for PCT Application PCT/JP2019/038667, Filed on Oct. 1, 2019, 7 pages including English Translation.
Extended European Search Report (EESR) dated Jul. 22, 2022 for European application No. 19 874 002.9, 16pp.

* cited by examiner

Fig. 7
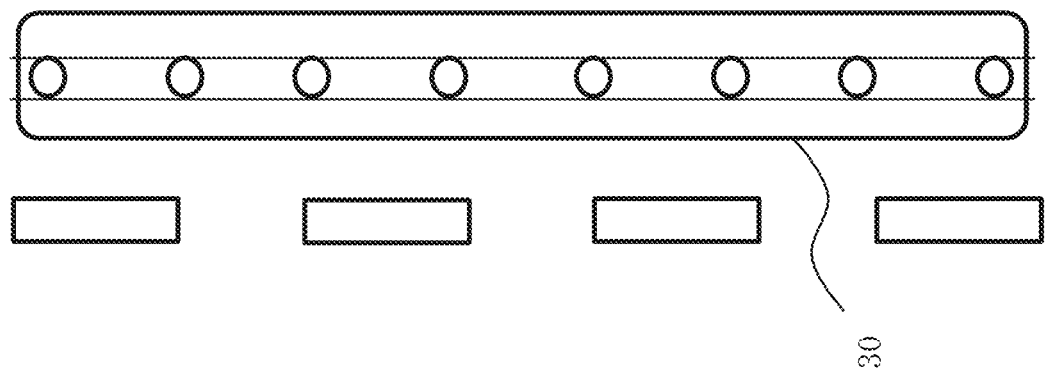
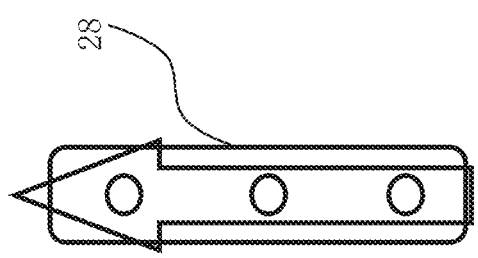
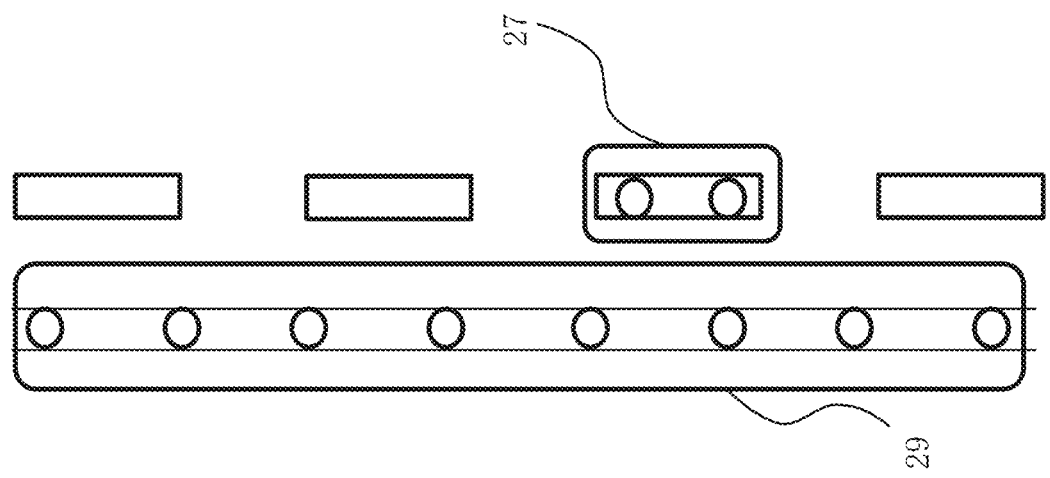

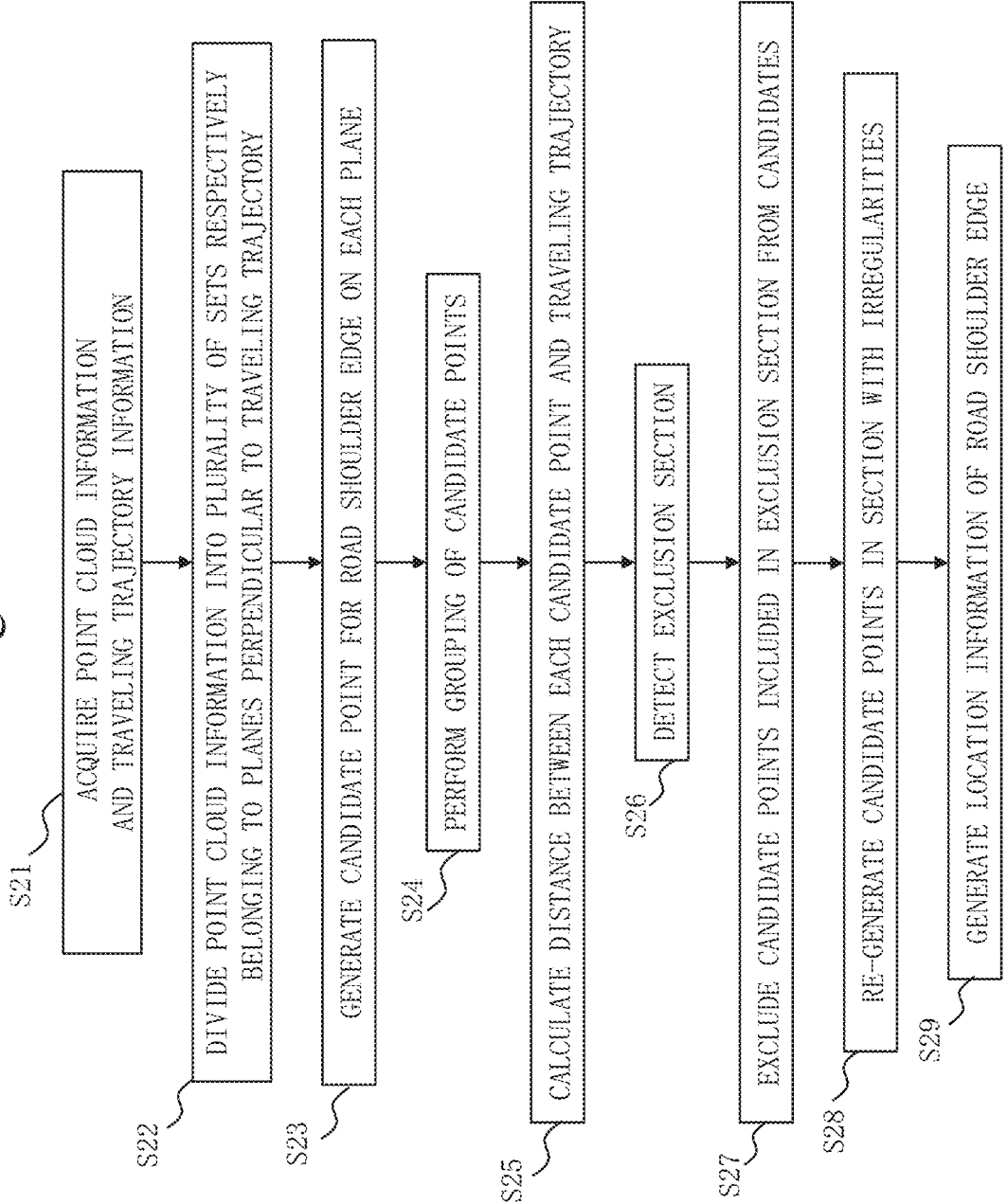

INFORMATION PROCESSING DEVICE THAT GENERATES BOUNDARY LOCATION INFORMATION OF A ROAD ON WHICH A VEHICLE TRAVELS BY AUTOMATED DRIVING

CROSS-REFERENCE TO RELATED APPLICATIONS

The present application is based on PCT filing PCT/JP2019/038667, filed Oct. 1, 2019, which claims priority to JP 2018-193957, filed Oct. 15, 2018, the entire contents of each are incorporated herein by reference.

TECHNICAL FIELD

The present invention relates to an information processing device that generates boundary location information indicating locations of boundaries of a road such as demarcation lines and road shoulder edges to be used as map information.

BACKGROUND ART

Automated driving by which a vehicle such as a car drives by automated control requires not only various sensors such as a camera and a laser radar that are attached to an automated driving vehicle and detect situations inside and outside the vehicle, but also map information called a dynamic map that highly accurately represents a road on which the vehicle is traveling. It is desirable that this highly accurate map information be created based on information resulting from actually measuring the vicinity of the real road. For example, a dynamic map can be created by collecting three-dimensional point cloud information indicating coordinates and luminance levels of points on the surfaces of features, such as the surface of a road for which map information is to be generated and facilities on the side of the road, or image information of the road, and analyzing the collected information.

As a method for collecting information resulting from actually measuring the vicinity of the road, there is a method in which a surveying vehicle, which is a vehicle in which a mobile mapping system is installed, is made to actually travel and three-dimensional point cloud information and the like of the road surface, facilities on the side of the road, and the like are collected. This mobile mapping system is a measurement device that is of a type to be installed in a vehicle and includes a positioning device such as a Global Navigation Satellite System (GNSS) receiver, an inertial measurement unit, and an odometer, and measurement equipment such as a laser scanner, which performs scanning with laser light and measures locations and reflection luminance levels of target objects at which the laser light is reflected, and a camera, and as a result of measurement by these positioning device and measurement device, collects location information of the traveling vehicle, three-dimensional point cloud information indicating coordinates and luminance levels of points on the surfaces of features in the vicinity of the traveled road, image information of the road, and the like.

Information obtained by the mobile mapping system is point cloud information and image information which are not map information, so that a plotting process is required to generate map information from the point cloud information. This plotting process is, for example, a process to generate lines indicating locations of boundaries necessary as map information, such as lines representing demarcation lines on the road and road shoulder edges of the road, based on the three-dimensional point cloud information. If the plotting process is performed manually and map information in a wide range is prepared, the amount of information of point clouds to be processed becomes enormous, resulting in enormous work costs. In particular, work costs for plotting demarcation lines and road shoulder edges, which are features that always exist along the road and are map information required to realize automated driving, are high. Therefore, techniques for performing this plotting process by software have been developed.

One of the techniques for performing this plotting process is a technique described in Patent Literature 1, for example. Patent Literature 1 discloses a device that plots a demarcation line and a road shoulder edge by setting traverse planes perpendicular to a traveling direction of a vehicle at predetermined intervals in three-dimensional measurement data of a road, extracting candidate points for the demarcation line and the road shoulder edge on each of the traverse planes that have been set, and connecting the candidate points extracted on the respective traverse planes. The candidate points for the demarcation line are extracted using reflection luminance level information included in the three-dimensional point cloud information obtained by a laser scanner, and the candidate points for the road shoulder edge are extracted using location information in the three-dimensional point cloud information.

CITATION LIST

Patent Literature

Patent Literature 1: JP 2017-78904 A

SUMMARY OF INVENTION

Technical Problem

In the plotting process disclosed in Patent Literature 1, the candidate points extracted on the respective traverse planes are simply connected with lines. For this reason, there is a problem, which is that although a demarcation line similar to the real demarcation line drawn on the road needs to be generated as map information, if there are a plurality of points with high reflection luminance levels on some of the traverse planes due to disturbance factors such as smudges on the road, a demarcation line whose shape is deviated from the shape of the real demarcation line will be generated. In addition, if a deceleration line exists next to a demarcation line, candidate points for the demarcation line and candidate points for the deceleration line will be connected, and a demarcation line whose shape is different from the shape of the real demarcation line will be generated. In addition, another problem is that when a road shoulder edge is to be plotted as a boundary, if location information of the road surface has not been obtained accurately in point cloud information due to disturbance factors such as weeds and another vehicle traveling alongside, locations of the roots of the weeds and locations of the tires of the vehicle traveling alongside will be extracted as candidate points and they will be connected, and as a result, a road shoulder edge whose shape is different from the shape of the real road shoulder edge will be generated.

The present invention has been made to solve the problems as described above, and aims to obtain an information processing device that generates boundary location information of a road in which inaccuracies due to disturbance factors are reduced.

Solution to Problem

An information processing device according to the present invention includes an information acquisition unit to acquire feature measurement information indicating locations of features including a road having a boundary and trajectory information indicating a trajectory along the road; a candidate location information generation unit to generate candidate location information indicating locations of candidate elements for the boundary, based on the feature measurement information acquired by the information acquisition unit; a selection unit to select candidate elements from among the candidate elements indicated by the candidate location information generated by the candidate location information generation unit, based on the trajectory information acquired by the information acquisition unit; and a boundary location information generation unit to generate boundary location information indicating determined locations of the boundary, using the candidate elements selected by the selection unit.

Advantageous Effects of Invention

An information processing device according to the present invention includes a candidate location information generation unit to generate, based on feature measurement information indicating locations of features including a road having a boundary, candidate location information indicating locations of candidate elements for the boundary; a selection unit to select candidate elements from among the candidate elements indicated by the candidate location information generated by the candidate location information generation unit, based on a trajectory along the road; and a boundary location information generation unit to generate boundary location information indicating determined locations of the boundary, using the candidate elements selected by the selection unit. Therefore, candidate elements excluding candidate elements that do not correspond to the trajectory along the road and are thus considered to be disturbance are selected in the selection unit, and based on the selected candidate elements, the boundary location information generation unit generates boundary location information, so that the boundary location information of the road in which inaccuracies due to disturbance factors are reduced can be generated.

BRIEF DESCRIPTION OF DRAWINGS

FIG. 7 is a conceptual diagram representing a method for excluding a group other than that of a demarcation line from a plurality of groups by the selection unit in the first embodiment;

FIG. 14 is a flowchart illustrating operation relating to generation of location information of a road shoulder edge by the information processing device in the first embodiment.

DESCRIPTION OF EMBODIMENTS

First Embodiment

An information processing device according to the present invention generates, based on feature measurement information indicating locations of features including a road having a boundary, candidate location information indicating locations of candidate elements for the boundary, and selects candidate elements corresponding to a trajectory along the road from among the candidate elements indicated by the generated candidate location information, thereby excluding candidate elements that do not correspond to the trajectory along the road and are thus considered to be disturbance, and based on the selected candidate elements, generates location information of the boundary of the road, thereby determining locations of the boundary of the road by reducing inaccuracies due to disturbance factors.

Figure 1:
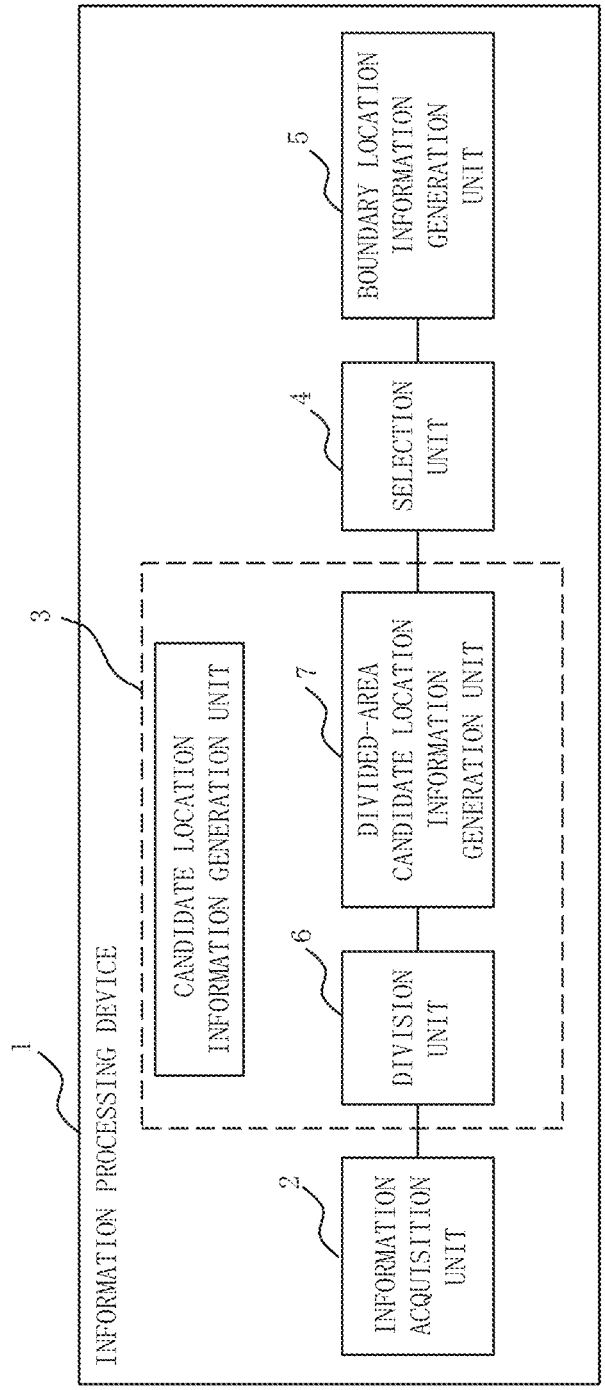
FIG. 1 is a configuration diagram illustrating a configuration of an information processing device in a first embodiment.

FIG. 1 is a configuration diagram illustrating a configuration of an information processing device 1 in a first embodiment to implement the present invention.

In the information processing device 1 illustrated in FIG. 1, an information acquisition unit 2 acquires feature measurement information indicating locations of features including a road having a boundary and trajectory information indicating a trajectory along the road. The features refer to elements that may be used as map information, which are elements such as demarcation lines and road markings depicted on the road, installed objects such as guard rails and road signs installed in the vicinity of the road, and road shoulder edges, which are edges of road shoulders. This embodiment will be described hereinafter using demarcation lines and road shoulder edges as the features.

A candidate location information generation unit 3 generates candidate location information indicating locations of candidate elements for the boundary, based on the feature measurement information and the trajectory information acquired by the information acquisition unit 2. A selection unit 4 selects candidate elements from among the candidate elements indicated by the candidate location information generated by the candidate location information generation unit 3, based on the trajectory information. A boundary location information generation unit 5 generates boundary location information indicating determined locations of the boundary, using the candidate elements selected by the selection unit 4.

The information processing device 1 is configured as described above, and each unit will be described in detail below.

The information acquisition unit 2 acquires feature measurement information indicating locations of features including a road having a boundary and trajectory information indicating a trajectory along the road. The feature measurement information and the trajectory information are acquired by measurement using a mobile mapping system. The mobile mapping system is installed in a mobile object such as, for example, a vehicle, an aircraft, or a drone. A vehicle in which the mobile mapping system is installed is referred to as a surveying vehicle. For example, the mobile mapping system includes a positioning device, such as a GNSS receiver, an inertial navigator, and an odometer, and measurement equipment, such as measurement devices like a laser scanner, a camera, and the like.

In this embodiment, feature measurement information is measured by the laser scanner included in the mobile mapping system. The laser scanner performs scanning with laser light and receives reflected light of the emitted laser light. The laser scanner is installed on the roof of the surveying vehicle, and scans the surface of the road and features in the vicinity of the road with laser light such that the laser light traverses the road. It is information including a location of a point at which reflected light of the laser light emitted from the laser scanner and reflected on the surface of a feature is received, a reflection luminance level indicating the intensity of reflected light when the laser light is reflected at the feature at the point of this location, and a time point when the location and the reflection luminance level are measured, and is measured by the laser scanner provided in the mobile mapping system. This feature measurement information is measured for each of different points on the surface of the feature, and a collection of feature measurement information at a plurality of points is referred to as point cloud information.

In this embodiment, trajectory information is traveling trajectory information indicating a traveling trajectory, at the time of measuring point cloud information, of the surveying vehicle in which the mobile mapping system is installed. In this embodiment, the traveling trajectory of the surveying vehicle is represented by a sequence of points collected from information on the location of the vehicle at each time point when measured by the GNSS receiver provided in the mobile mapping system, and is represented, for example, by a sequence of points obtained by measurement by setting the update rate of the GNSS receiver to 100 Hz, that is, by measuring location information of the surveying vehicle at every 0.01 seconds. The update rate of the GNSS receiver is not limited to 100 Hz, and may be changed depending on the granularity of the trajectory to be set.

In this embodiment, point cloud information acquired by the mobile mapping system is used as feature measurement information. However, this is not limiting, and provided that locations of features are indicated, information on locations of features generated by image processing from image data captured by the camera installed in the mobile mapping system, for example, may be used. The method for acquiring feature measurement information is not limited to measurement by the mobile mapping system, and feature measurement information may be acquired by measurement by measurement equipment installed in an aircraft or a drone, for example.

Similarly, trajectory information is not limited to that described above, provided that a trajectory along the road corresponding to feature measurement information is indicated. For example, flight trajectory information indicating a flight trajectory of an aircraft or a drone, instead of the traveling trajectory of the surveying vehicle, may be used. In this embodiment, trajectory information is assumed to be a sequence of points consisting of results of measurement by the GNSS receiver at each time point. However, instead of a sequence of points, a curve generated based on the sequence of points may be used. A trajectory is not limited to a movement trajectory of a mobile object that moves along the road, such as a traveling trajectory or a flight trajectory, and may be created manually by visualizing point cloud information and using a paint tool or the like, for example.

Furthermore, feature measurement information and trajectory information are not limited to those acquired at the same time, and feature measurement information may be acquired by an aircraft and trajectory information may be acquired by a vehicle, for example, provided that both are information concerning the same road.

The candidate location information generation unit 3 generates candidate location information indicating locations of candidate elements for the boundary of the road, based on the feature measurement information acquired by the information acquisition unit 2. In this embodiment, the candidate location information generation unit 3 includes a division unit 6 to set a plurality of areas and divide the feature measurement information into sets respectively belonging to the plurality of areas that have been set, and a divided-area candidate location information generation unit 7 to generate candidate location information, based on the feature measurement information in each area after being divided by the division unit 6.

The division unit 6 sets a plurality of areas, and divides the feature measurement information acquired by the information acquisition unit 2 into sets respectively belonging to the plurality of areas that have been set. That is, the division unit 6 divides the feature measurement information acquired by the information acquisition unit 2 into sets each belonging to one of the areas that have been set. In this embodiment, a plurality of areas are a plurality of planes perpendicular to the traveling trajectory, indicated by the traveling trajectory information, of the surveying vehicle in which the mobile mapping system is installed.

In this embodiment, a plurality of areas are assumed to be planes perpendicular to the traveling trajectory. However, this is not limiting, and they may be curved planes or cuboids instead of planes, and may be intersecting diagonally instead of being perpendicular. That is, a plurality of areas are not limited to perpendicular planes, and may be a plurality of spaces intersecting the trajectory indicated by the trajectory information.

Instead of being divided based on spatial positions, the feature measurement information may be divided at predetermined time intervals, based on measurement time points indicated by measurement time point information included in point cloud information. For example, when the mobile mapping system measures features, if the laser scanner performs measurement while rotating in a direction perpendicular to the traveling direction of the vehicle, it may be desirable to divide feature measurement information into pieces of data each corresponding to one rotation of the laser scanner. In such a case, a space corresponding to time required for one rotation may be set as each area.

When point cloud information is divided into sets respectively belonging to a plurality of areas, each set may be formed by selecting some points instead of all points in each area. This can reduce the amount of information on which data processing is performed and prevent a delay in data processing when the amount of information in the point cloud information is larger than necessary.

The divided-area candidate location information generation unit 7 generates candidate location information indicating locations of candidate elements for a boundary of a feature, based on the feature measurement information in each area after being divided by the division unit 6. The candidate elements refer to elements that may form a boundary of a feature, and are points, line segments, faces, and the like. In this embodiment, a case in which points are treated as candidate elements will be described hereinafter.

In this embodiment, boundaries are demarcation lines and road shoulder edges. To generate candidate location information of a demarcation line, information on locations and luminance levels of features included in feature measurement information is used. To generate candidate location information of a road shoulder edge, information on only locations of features is used. Therefore, although point cloud information is assumed to include information on locations, luminance levels, and time points in this embodiment, if only road shoulder edges are to be plotted, feature measurement information may include only information on locations of features.

A method for generating candidate location information of a demarcation line as a boundary in the divided-area candidate location information generation unit 7 will now be described.

Figure 2:
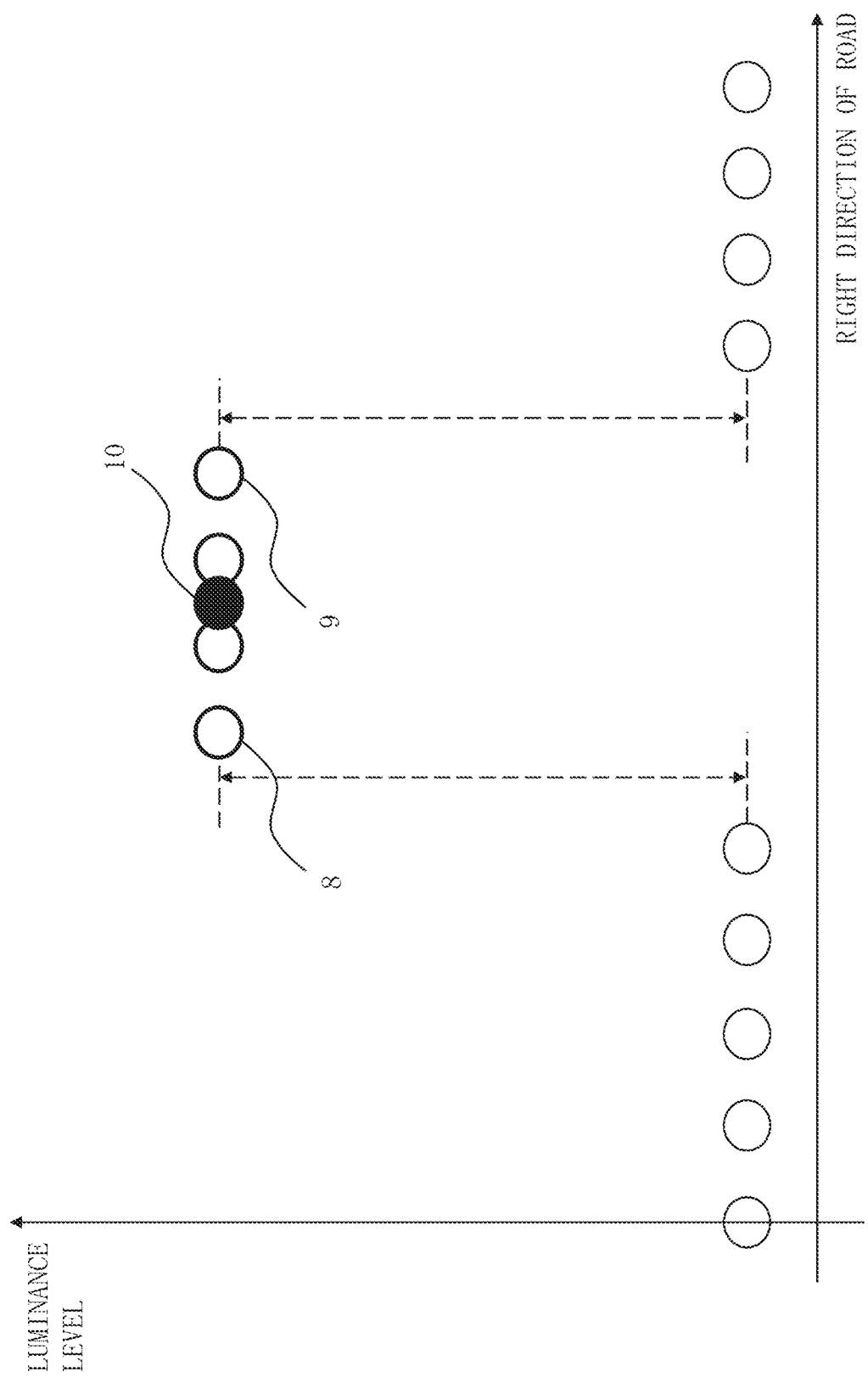
FIG. 2 is a conceptual diagram representing a method for generating candidate location information of a demarcation line by a divided-area candidate location information generation unit in the first embodiment.

FIG. 2 is a conceptual diagram representing a method for generating candidate location information of a demarcation line based on point cloud information, on a certain plane set as an area by the division unit 6. The range of the demarcation line is recognized by utilizing the fact that there is a large difference between the luminance level of the road surface and the luminance level of the demarcation line, and based on the range, candidate locations for the demarcation line are generated.

In the graph illustrated in FIG. 2, the vertical axis indicates the luminance level of features, and the horizontal axis indicates a right direction of the road on a certain plane set by the division unit 6. The right direction of the road is a direction that is perpendicular to both a traveling direction of the vehicle and a vertically upward direction and such that the right side facing the traveling direction of the vehicle is positive.

The coordinate origin may be set in any way. In this embodiment, it is assumed that the origin position of the vertical axis is 0 [W/sr/m$^2$], and the origin position of the horizontal axis is the location of a point with the smallest coordinate value in the right direction of the road among points included in a point cloud on the plane.

The divided-area candidate location information generation unit 7 checks the luminance levels of points included in point cloud information sequentially in order of coordinate values in the right direction of the road, starting with a point with the smallest coordinate value, and detects a point with a sharp increase in the luminance level, that is, a point 8 whose luminance level differs from that of the immediately preceding point by more than a threshold value (for example, a set value of displacement in reflection intensity of reflected light of laser light), and detects a point with a sharp decrease in the luminance level, that is, a point 9 whose luminance level differs from that of the next point by more than the threshold value. Then, if the interpoint width between the point 8 and the point 9 is within a specified width between the upper and lower limits, a candidate point 10 is generated by treating the location of the median point among points with high luminance levels, that is, points between the point 8 and the point 9, as a candidate element for the demarcation line, and candidate location information indicating the location of the candidate point 10 is generated. Alternatively, if the interpoint width between the point 8 and the point 9 is within the specified width between the upper and lower limits, the candidate point 10 may be generated by treating the location of the center between the point 8 and the point 9 as a candidate element for the demarcation line, and candidate location information indicating the location of the candidate point 10 may be generated.

This will generate a sequence of points of the candidate points 10 for the demarcation line that line up in the traveling direction of the vehicle over the demarcation line.

Figure 3:
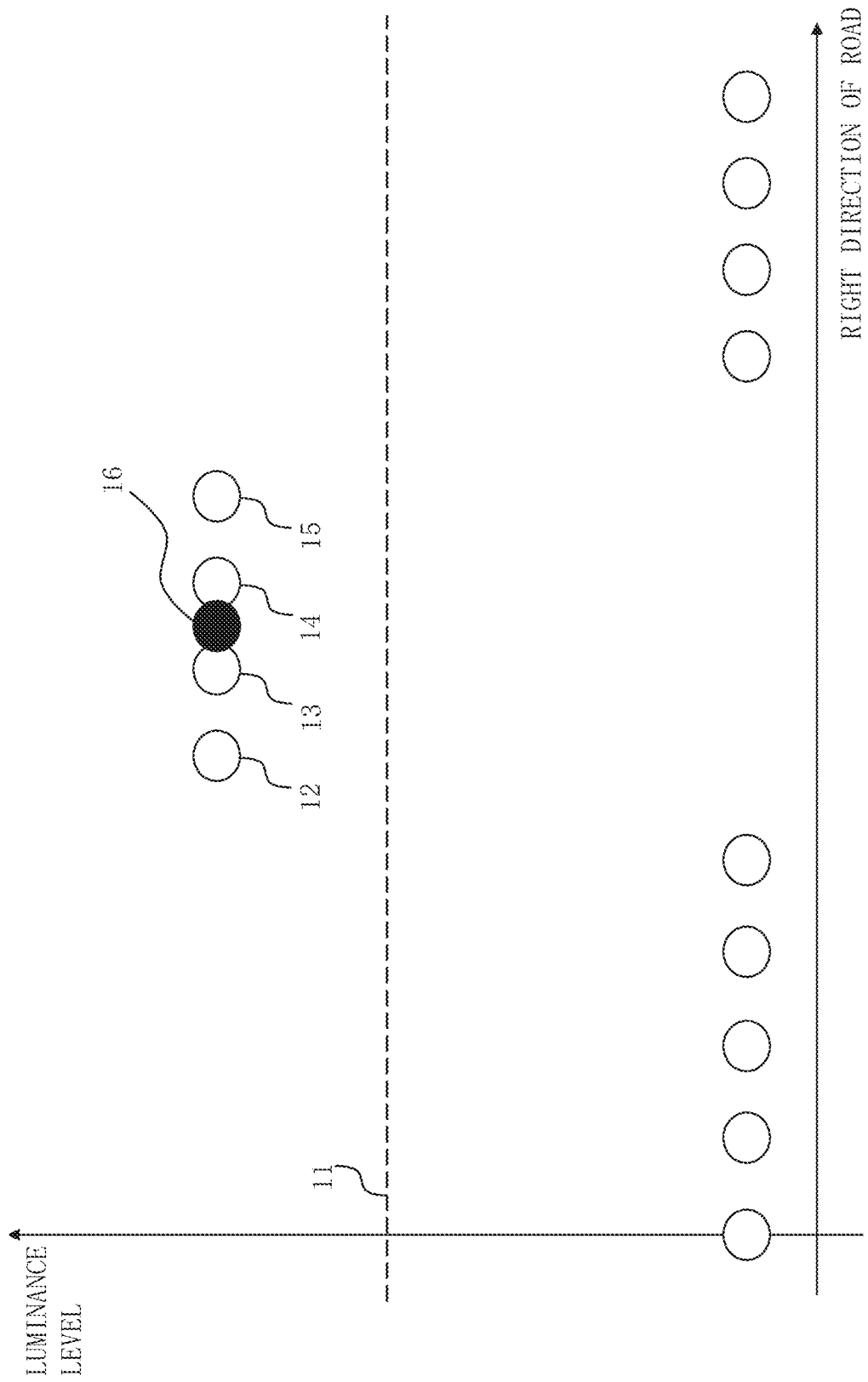
FIG. 3 is a conceptual diagram representing a method for generating candidate location information of a demarcation line by the divided-area candidate location information generation unit in the first embodiment.

The method for generating candidate location information indicating locations of candidate elements for the demarcation line is not limited to the above method. For example, instead of using a difference in the luminance level from an adjacent point as described above, candidate location information may be generated by setting a threshold value 11 for the luminance value in advance, as illustrated in FIG. 3, extracting a point 12, a point 13, a point 14, and a point 15, included in point cloud information, whose luminance levels are equal to or above the threshold value, treating the extracted points as the range of the demarcation line, and if the width of the range of the demarcation line is within the specified width between the upper and lower limits, treating the location of the median point of these points as a candidate point 16 for the demarcation line.

Next, a method for generating candidate location information of a road shoulder edge will be described.

Figure 4:
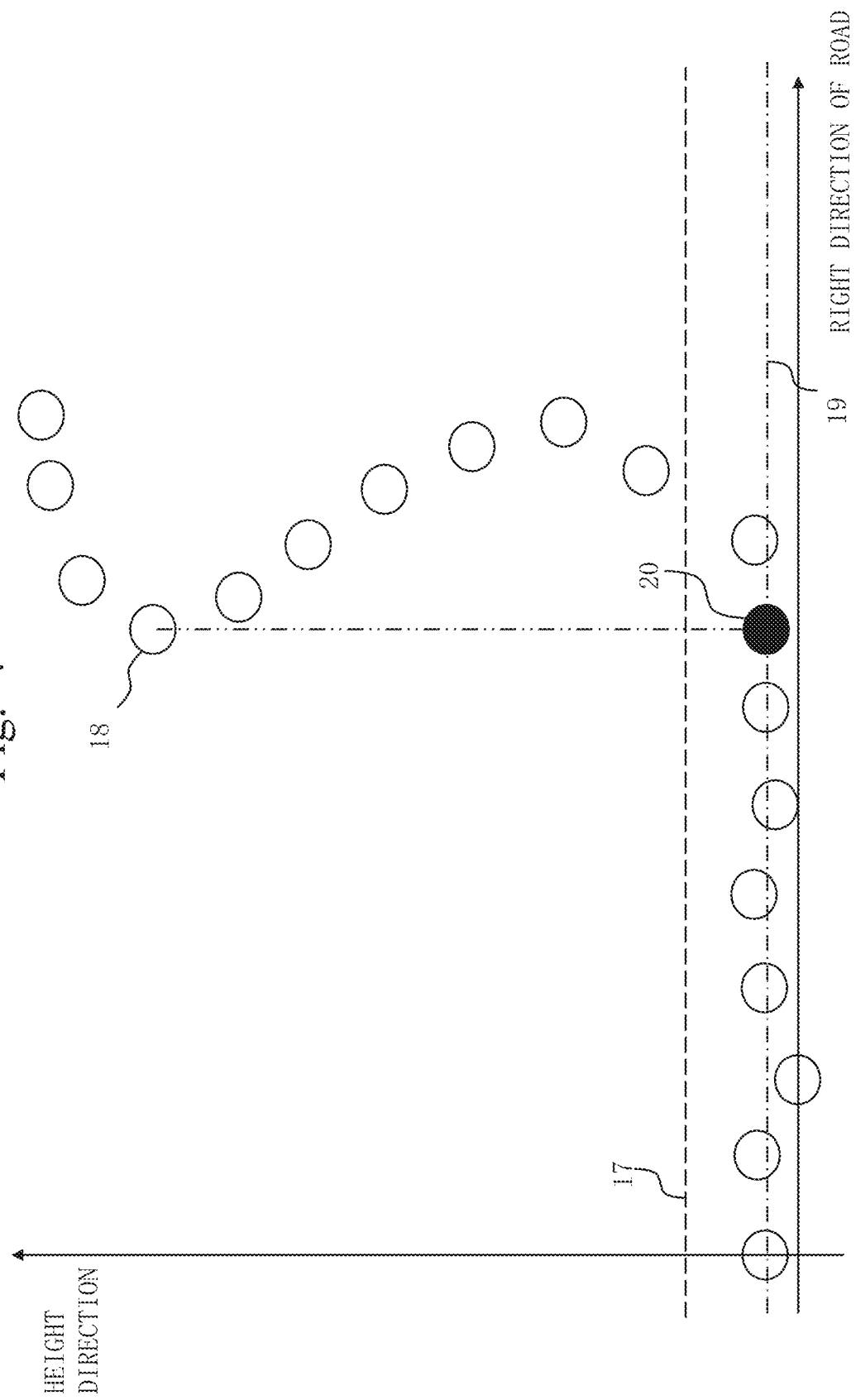
FIG. 4 is a conceptual diagram representing a method for generating candidate location information of a road shoulder edge by the divided-area candidate location information generation unit in the first embodiment.

FIG. 4 is a conceptual diagram representing a method for generating candidate location information of a road shoulder edge based on point cloud information, on a certain plane set by the division unit 6. By utilizing the fact that there is a difference between the height of a road surface and the height of a road shoulder, the location of the road shoulder is recognized, and based on the location of the road shoulder, candidate locations for the road shoulder edge are generated.

In the graph illustrated in FIG. 4, the vertical axis indicates a height direction, that is, a vertically upward direction on a certain plane set by the division unit 6, and the horizontal axis indicates the right direction of the road on this plane. The coordinate origin may be set in any way. In this embodiment, it is assumed that the origin position of the vertical axis is the location of a point at the lowest position among points included in a point cloud on the plane, and the origin position of the horizontal axis is the location of a point with the smallest coordinate value in the right direction of the road among the points included in the point cloud on the plane.

First, the divided-area candidate location information generation unit 7 classifies the point cloud information into points on the road and points of features other than the road, such as a curb and an installed object. This classification is performed by setting a threshold value 17 for the height direction in advance, and treating a point whose height is less than the threshold value 17 as the road and a point whose height is equal to or above the threshold value 17 as a point other than the road. Then, a point closest to the traveling trajectory indicated by the trajectory information obtained from the information acquisition unit 2 is extracted from among the points classified as points other than the road. In the example in FIG. 4, although the traveling trajectory is not illustrated, it is positioned to the left of the origin point, so that a point 18 is extracted as the point closest to the traveling trajectory. Then, the location of the foot of a perpendicular line drawn from the location of the extracted point 18 to a road surface 19 is treated as a candidate point 20 for the road shoulder edge, and candidate location information indicating the location of the candidate point 20 is generated. The road surface 19 may be set in advance as with the threshold value 17, or an approximate plane may be generated based on the points determined as points on the road because of a height less than the threshold value 17, and the generated plane may be treated as the road surface.

A road shoulder edge is a boundary indicating an edge of the road. To be used as map information, only one road shoulder edge is set on each of the right and left sides of the traveling direction of the vehicle, so that it is arranged that only one candidate point for the road shoulder edge be generated on each of the right and left sides of the traveling trajectory on one plane.

This will generate a sequence of points of the candidate points 20 for the road shoulder edge that are lined up in the traveling direction of the vehicle.

Figure 5:
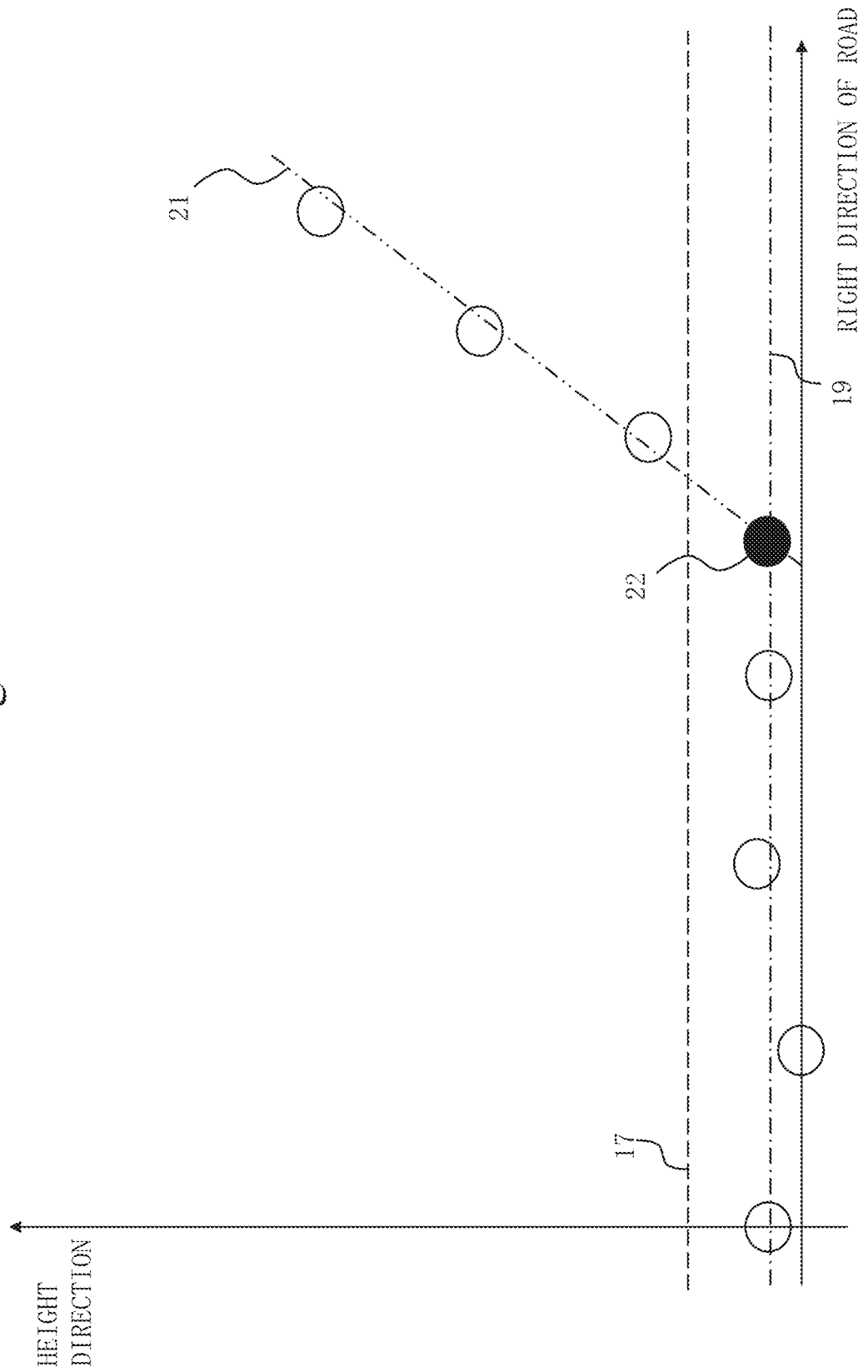
FIG. 5 is a conceptual diagram representing a method for generating candidate location information of a road shoulder edge by the divided-area candidate location information generation unit in the first embodiment.

How to obtain candidate points for a road shoulder edge is not limited to the method described above. For example, the coordinate values, in the height direction, of points included in point cloud information may be sequentially checked, starting with a point with the smallest coordinate value in the right direction of the road, to extract a point with a sharp decrease in the coordinate value and a point with a sharp increase in the coordinate value, and these points may be treated as candidate points for the road shoulder edge. As illustrated in FIG. 5, if the outer side of the shoulder of the road is a slope such as a bank, and moreover, a point cloud is sparse, an approximate straight line 21 may be generated based on a plurality of points with sharp changes in the height, and the intersection between this straight line and the road surface may be treated as a candidate point 22 for the road shoulder edge.

The divided-area candidate location information generation unit 7 obtains a candidate point for a boundary of a feature, that is, a candidate point for a demarcation line or a road shoulder edge, for each area set by the division unit 6, and generates candidate location information indicating the location of each candidate point, as described above.

The selection unit 4 selects candidate elements for a boundary from among the candidate elements generated by the candidate location information generation unit 3, based on the trajectory information acquired by the information acquisition unit 2. Specifically, the selection unit 4 of this embodiment selects candidate points for the road shoulder edge or the demarcation line corresponding to the traveling trajectory, based on the distance between the candidate point (the candidate point 10 or the candidate point 16 for the demarcation line, the candidate point 20 or the candidate point 22 for the road shoulder edge) in each area obtained by the operation of the candidate location information generation unit 3 and the traveling trajectory. Furthermore, in this embodiment, the selection unit 4 selects candidate points for the road shoulder edge or the demarcation line corresponding to the traveling trajectory, based on the distance between candidate elements, that is, the distance between candidate points.

First, a method for selecting candidate points for a demarcation line by the selection unit 4 will be described.

Figure 6:
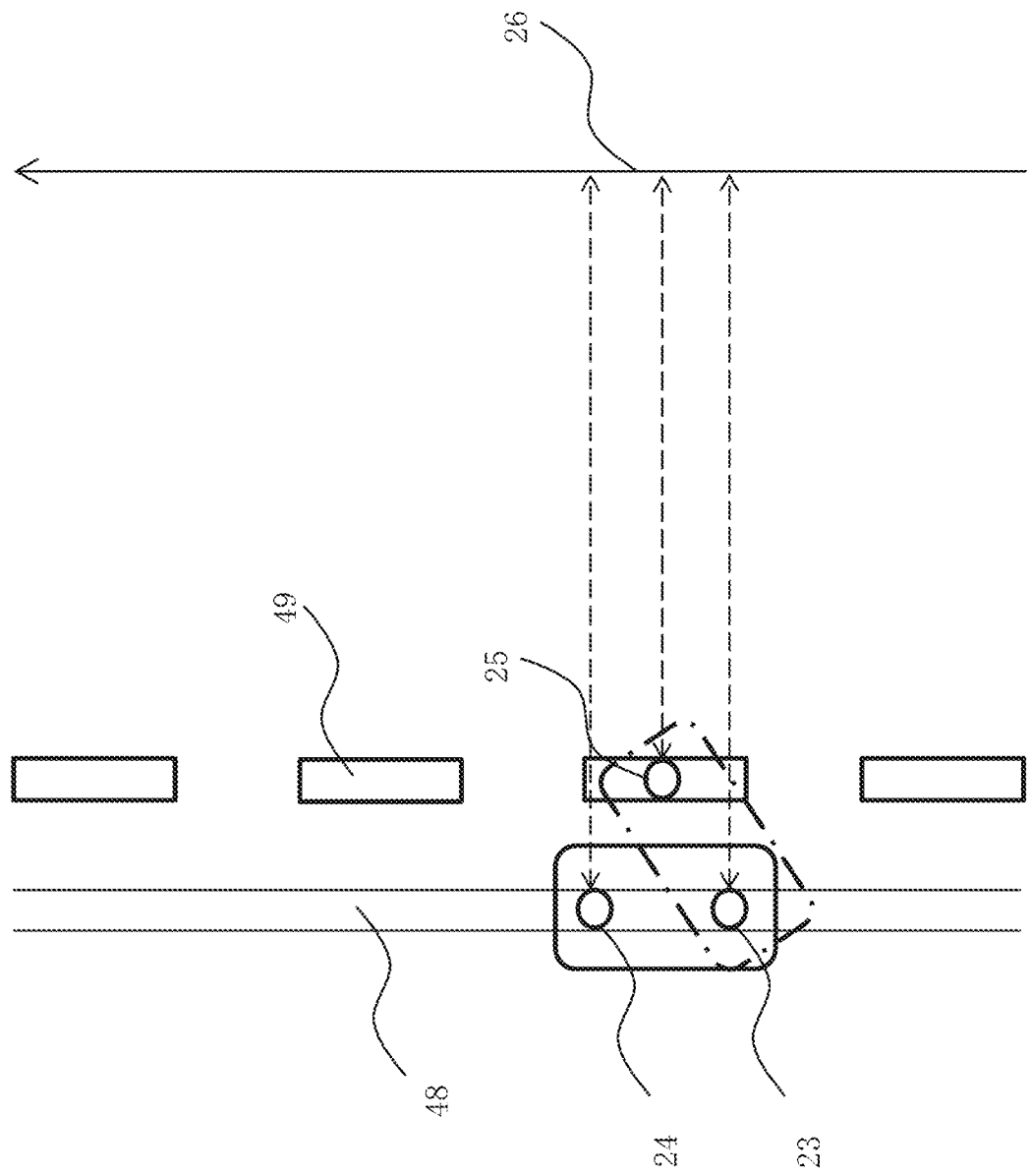
FIG. 6 is a conceptual diagram representing a method for grouping candidate points for a demarcation line by a selection unit in the first embodiment.

To select candidate points for the demarcation line, grouping of candidate points is performed first. FIG. 6 is a conceptual diagram representing a method for grouping of candidate points for the demarcation line, and illustrates a demarcation line 48 and a deceleration line 49 that are depicted on the road and a traveling trajectory 26 projected on the road surface. FIG. 6 also illustrates candidate points 23, 24, and 25, which are among the candidate points obtained in the divided-area candidate location information generation unit 7.

The selection unit 4 calculates the distance between the candidate point for the demarcation line generated on each plane by the divided-area candidate location information generation unit 7 and the traveling trajectory, and the distance between the candidate points.

Then, with regard to certain two candidate points, if the distance between the two candidate points is within a predetermined range and a difference between the two candidate points concerning the distance to the traveling trajectory is within a predetermined range, these two candidate points are grouped into the same group. In FIG. 6, a difference between the distance between the candidate point 23 and the traveling trajectory 26 and the distance between the candidate point 24 and the traveling trajectory 26 is small, so that the candidate point 23 and the candidate point 24 are grouped into the same group. With regard to the candidate point 23 and the candidate point 25, a difference between these points concerning the distance to the traveling trajectory 26 is large, so that these candidate points are not grouped into the same group.

The selection unit 4 performs this process for all combinations of candidate points, and performs grouping for all the candidate points. In this embodiment, the above process is performed on all combinations of candidate points. However, the above process may be performed only on combinations of points whose measurement time points are close to each other, based on measurement time point information included in point cloud information.

The demarcation line is assumed to be approximately parallel to the traveling trajectory. Thus, if candidate points generated by the divided-area candidate location information generation unit 7 exist on the demarcation line, these candidate points will be grouped into the same group. However, if a point on the road surface other than the demarcation line is extracted as a candidate point because its luminance level is high due to the influence of a line different from the demarcation line, such as the deceleration line 49 illustrated in FIG. 6, or a smudge, for example, the distance between this point and the traveling trajectory is different when compared with points on the demarcation line, so that this point is not grouped into the same group as the candidate points on the demarcation line. Therefore, it is possible to form a group of points on the demarcation line not including disturbance factors such as a smudge on the road surface or a line other than the demarcation line.

Furthermore, the selection unit 4 performs integration of groups. That is, if a candidate point included in a certain group is also included in another different group, all the candidate points included in these two groups are integrated into one group. This will create a group including many candidate points corresponding to the traveling trajectory 26.

In this way, it is possible to separately form a group of candidate points to be used for generating a boundary and a group due to a disturbance factor such as a smudge on the road surface.

Although the traveling trajectory is depicted as an arrow in FIG. 6, the traveling trajectory is a sequence of points indicating the location of the vehicle at each time point measured by the GNSS receiver in this embodiment. Therefore, in this embodiment in actuality, the distance between each candidate point for the demarcation line and each point included in the sequence of points of the traveling trajectory is calculated, and the distance between each candidate point and a point of the traveling trajectory located at the shortest distance is treated as the distance between each candidate point and the traveling trajectory. When the traveling trajectory is treated as a curve instead of a sequence of points, a perpendicular line may be drawn downward from each candidate point to the curve and the length of the perpendicular line may be calculated.

In the method of grouping candidate points described above, if a difference between candidate points concerning the distance to the traveling trajectory is within the predetermined range, these points are grouped together. Thus, also in the case of points other than those on the demarcation line, if a difference between points on a deceleration line or a road marking, for example, concerning the distance to the traveling trajectory is within the predetermined range, these points may be grouped together. However, such a group is not a group of points on the demarcation line and thus needs to be excluded from candidates for the boundary. To do this, a group in which the number of candidate points included in the group is equal to or smaller than a predetermined number is extracted, and if this group is located between groups whose numbers of candidate points are larger than that of this group and the distance to each of the larger groups is shorter than the size of a preset road width, this group is deleted. This can prevent points on a road marking and the like from being used for generating location information of the demarcation line.

The above process will be described using FIG. 7. FIG. 7 is a conceptual diagram representing a method for excluding a group other than those of the demarcation line from a plurality of groups. In FIG. 7, a group 29 and a group 30, each formed by candidate points on the demarcation line, are large groups, and a group 27 on a deceleration line and a group 28 on a road marking that are between the large groups are excluded.

The method for selecting candidate points for the demarcation line is not limited to the method described above. Instead of calculating the distance between each candidate point and the traveling trajectory with regard to two candidate points, candidate points whose absolute values of the distance to the traveling trajectory are within a predetermined range may be grouped together.

Next, a method for selecting candidate elements for the road shoulder edge by the selection unit 4 will be described.

On each plane, there is only one candidate point for the road shoulder edge generated by the divided-area candidate location information generation unit 7 on each of the right and left sides of the traveling trajectory of the vehicle. For this reason, the selection unit 4 groups the candidate points for the road shoulder edge that are located on the left side of the traveling trajectory on the respective planes into one group, and groups candidate points for the road shoulder edge that are located on the right side of the traveling trajectory on the respective planes into one group different from the group for the road shoulder edge on the left side.

In measurement by the laser scanner installed in the mobile mapping system, point cloud information may not be able to be measured accurately due to the influence of plants or another vehicle travelling alongside. If grouping is performed by the above method using candidate points obtained from such point cloud information not measured accurately, since each candidate point is grouped into either of two groups by being distinguished based on whether it is located on the right or left side of the traveling trajectory, a road shoulder edge that is not smooth, having sharp irregularities sideways, that is, a road shoulder edge deviated from the shape of the real road shoulder edge may be generated. Therefore, a section including large irregularities sideways in the positions of candidate points is determined as erroneous detection, and the boundary location information generation unit 5 excludes the candidate points included in the section determined as erroneous detection from the candidate points to be used for generating location information of the road shoulder edge.

In order to select appropriate candidate points, the selection unit 4 compares the shape of each group of candidate points with the shape of the traveling trajectory. Specifically, the distance between each candidate point in the group and the traveling trajectory is calculated, and a point at which this distance changes from that of an adjacent candidate point by a predetermined threshold value or more is extracted. By this, candidate points corresponding to the traveling trajectory can be selected by detecting a portion where a point cloud is not acquired accurately due to the influence of plants or another vehicle traveling alongside and there are candidate points that might generate a road shoulder edge deviated from the shape of the real road shoulder edge, and excluding the detected candidate points.

In this way, the candidate points to be used for generating a boundary can be selected by excluding disturbance factors such as smudges on the road surface.

Figure 8:
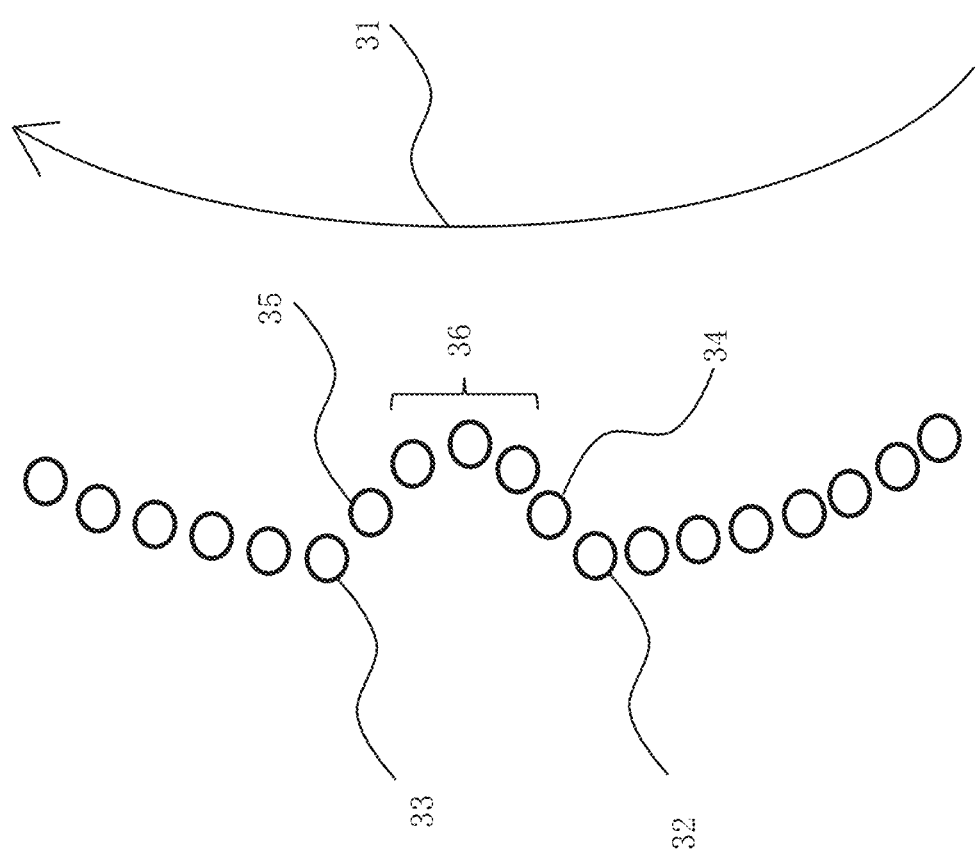
FIG. 8 is a conceptual diagram representing a method for selecting candidate points for a road shoulder edge by the selection unit in the first embodiment.

The above method will be specifically described using FIG. 8. FIG. 8 is a conceptual diagram representing a method for selecting candidate points for a road shoulder edge.

Since the points included in point cloud information have information on measurement time points, the distance between each candidate point and the traveling trajectory is checked sequentially, starting with a point with the earliest time point and ending with a point with the latest time point. Then, points with a sharp change in the distance to the traveling trajectory, that is, a candidate point 32 whose distance to the traveling trajectory indicates a sharp decrease from that of a next candidate point 34 and a candidate point 33 whose distance to the traveling trajectory indicates a sharp increase from that of the preceding point 35 are detected. The candidate point 32 and the candidate point 33 are ends of the candidate points that are detected accurately, and the candidate point 34, the candidate point 35, and candidate points 36 between the candidate point 34 and the candidate point 35 are detected erroneously, so that these candidate points are excluded from the candidate points to be used for generating location information of the road shoulder edge.

The method for comparing the shape of a group of candidate points with the shape of the traveling trajectory is not limited to the above method. For example, an approximate curve represented by a cubic function may be generated from a plurality of candidate points, for each fixed distance interval including a plurality of candidate points, and whether each candidate point should be used for generating location information of the road shoulder edge may be determined based on the distance between the approximate curve and the candidate point. In the case of a normal smooth road shoulder edge, it can be represented by a cubic function, so that the distance between the approximate curve and a candidate point is small. If irregularities sideways are caused by plants or the like, the distance between the approximate curve and a candidate point increases, so that it can be determined as erroneous detection.

The boundary location information generation unit 5 generates boundary location information indicating determined locations of a boundary, using the candidate elements selected by the selection unit 4. In this embodiment, the boundary location information generation unit 5 generates location information of a demarcation line or location information of a road shoulder edge, based on the traveling trajectory indicated by the traveling trajectory information and using the candidate points selected by the selection unit 4.

First, a method for generating location information of a demarcation line will be described.

The boundary location information generation unit 5 connects groups grouped as the candidates for the demarcation line by the selection unit 4.

In measurement of reflection luminance levels of features by the laser scanner, if there is a section where the demarcation line is faded, the measured reflection luminance level of the demarcation line in that section may not be very high. In such a situation, the candidate location information generation unit 3 may not be able to properly generate candidate elements in that section, and groups of the demarcation line generated by the selection unit 4 may be scattered at locations separated from each other. Therefore, the boundary location information generation unit 5 connects groups of the demarcation line existing at separate locations, based on the traveling trajectory of the surveying vehicle.

To connect groups signifies to generate candidate points for the demarcation line between two groups at predetermined distance intervals. The traveling trajectory of the surveying vehicle is used to connect the groups. Specifically, candidate points are generated such that an approximate curve formed by the two groups and the candidate points generated between the two groups is shaped similarly to the nearby traveling trajectory.

To connect the groups, the location of the median point of the candidate points included in each group is calculated first, and then the distance between the median point of one of the groups and each candidate point included in the other group is calculated. Some candidate points are extracted sequentially in order of this distance, starting with a point with the shortest distance. By interchanging the roles of the groups, some candidate points are also extracted from the other group. Then, the location of the median point of the extracted candidate points are calculated in each of the groups, and the distance between the median points of the two groups is calculated. If this distance between the median points is within a predetermined range, the two groups are connected.

Figure 9:
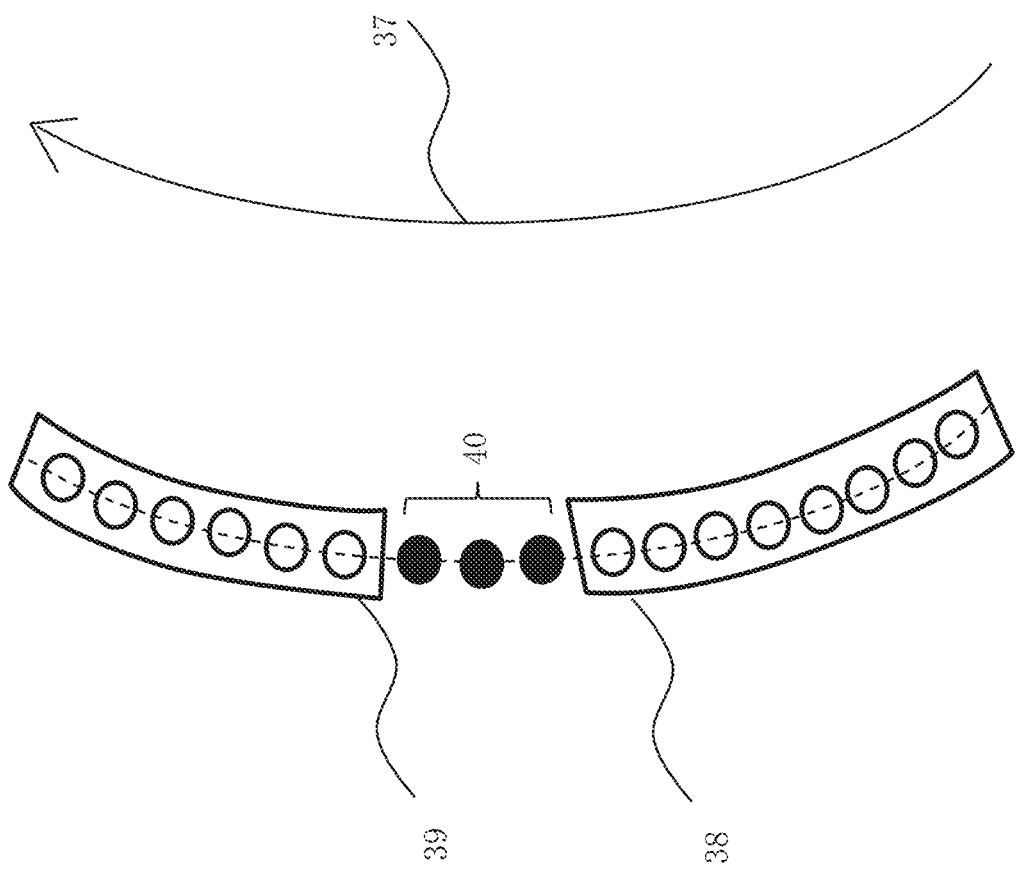
FIG. 9 is a conceptual diagram representing a method for connecting two groups of a demarcation line by a boundary location information generation unit in the first embodiment.

The above method will be specifically described using FIG. 9. FIG. 9 is a conceptual diagram representing a method for connecting two groups of a demarcation line.

Using a traveling trajectory 37 of the surveying vehicle, a group 38 and a group 39 of the demarcation line are connected. If the group 38 and the group 39 are within a predetermined distance range, candidate points 40 are generated so that these two groups are joined. These candidate points 40 are generated such that an approximate curve formed by the group 38, the group 39, and the candidate points 40 is shaped similarly to the traveling trajectory 37.

In FIG. 9, the traveling trajectory is depicted as an arrow. In this embodiment, however, the traveling trajectory is a sequence of points indicating the location of the vehicle at each time point when measured by the GNSS receiver. Therefore, in this embodiment, an approximate curve is first generated from the sequence of points measured by the GNSS receiver, and two groups are connected such that this approximate curve is shaped similarly to an approximate curve formed by the two groups and newly generated candidate points. However, the method for connecting two groups is not limited to the above method, and groups may be connected using only the positional relationship with a sequence of points measured by the GNSS receiver without generating an approximate curve. For example, two groups may be connected by generating new candidate points such that the angles formed by connecting the points measured by the GNSS receiver with straight lines are the same as the angles formed by connecting the candidate points newly generated between the two groups with straight lines.

Then, location information of the finally obtained candidate points for the demarcation line is generated as location information of the demarcation line indicating determined locations of the demarcation line.

Next, a method for generating location information of a road shoulder edge will be described.

Figure 10:
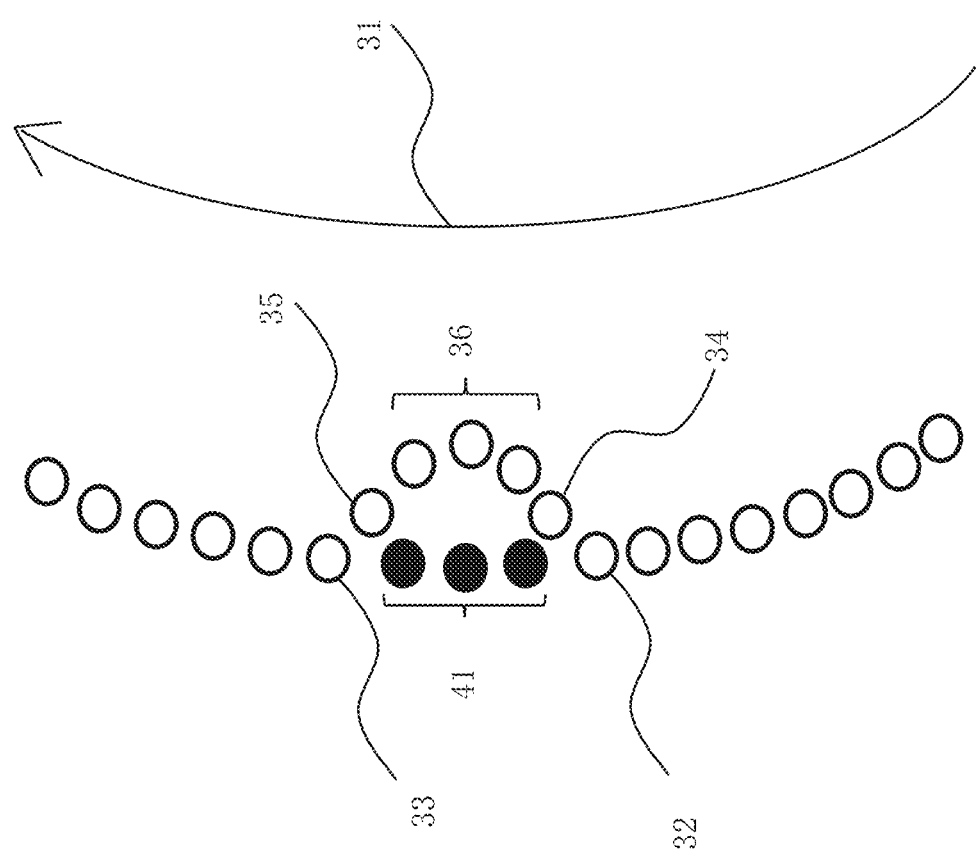
FIG. 10 is a conceptual diagram representing a method for generating location information of a road shoulder edge by the boundary location information generation unit in the first embodiment.

As illustrated in FIG. 10, the boundary location information generation unit 5 deletes the candidate point 34, the candidate point 35, and the candidate points 36 included in the section determined as erroneously detected as the candidates for the road shoulder edge by the selection unit 4. For the deleted section, candidate points 41 are generated utilizing the shape of the traveling trajectory 31. A specific method is the same as the method used to connect groups in generating location information of the demarcation line. The candidate points 41 are generated such that an approximate curve formed by candidate points other than the candidate point 34, the candidate point 35, and the candidate points 36 that have been excluded is shaped similarly to the nearby traveling trajectory 31.

When candidate points for a road shoulder edge are to be generated, if a demarcation line has already been plotted, the demarcation line may be used instead of the traveling trajectory. Conversely, when groups of a demarcation line are to be connected, if a road shoulder edge has already been plotted, the road shoulder edge may be used instead of the traveling trajectory.

Figure 11:
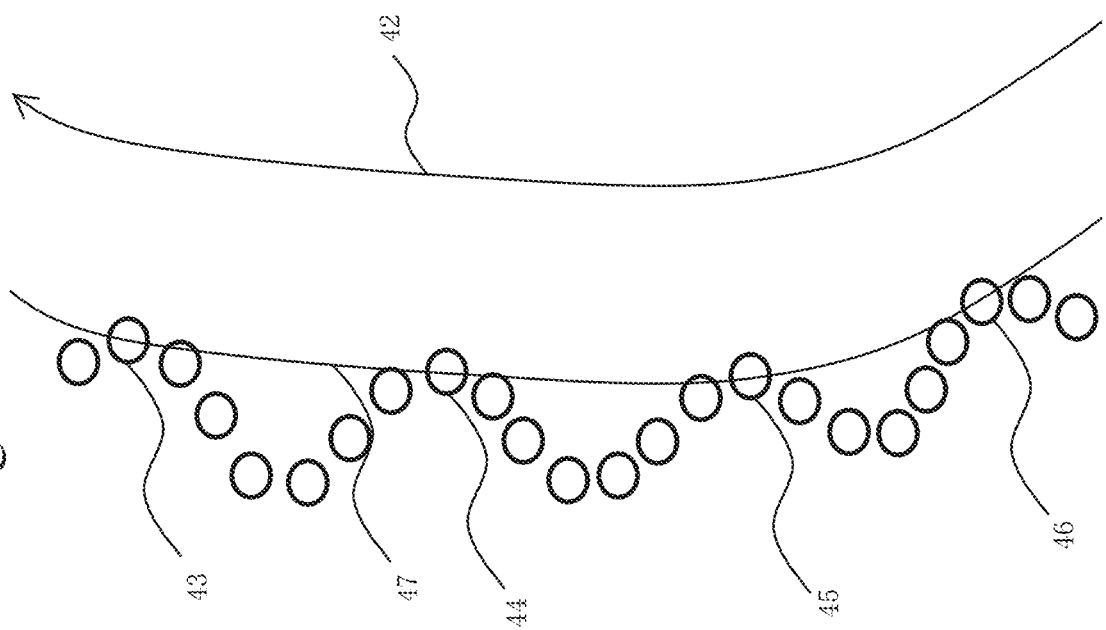
FIG. 11 is a conceptual diagram representing a method for generating location information of a road shoulder edge by the boundary location information generation unit in the first embodiment.

As to the generation of location information of a road shoulder edge where there are significant irregularities sideways and a significant deviation from the shape of the real road shoulder edge, location information may be generated by using only points that are locally near the trajectory of the vehicle itself and connecting these points, as illustrated in FIG. 11. In FIG. 11, location information of a road shoulder edge 47 can be generated by using a candidate point 43, a candidate point 44, a candidate point 45, a candidate point 46, and a traveling trajectory 42 and generating new candidate points (not illustrated) on a line connecting the candidate point 43, the candidate point 44, the candidate point 45, and the candidate point 46.

In automated driving of a vehicle, it is often the case that driving is set so as not to stray outside the road shoulder edge. Thus, by generating a road shoulder edge, using only candidate points at a shorter distance to the traveling trajectory, that is, the center of the road, the vehicle can travel without contacting the road shoulder even in a situation in which the vehicle travels by automated driving while being positioned near the road shoulder edge.

The boundary location information generation unit 5 generates location information of the candidate points for the road shoulder edge thus obtained, as location information of the road shoulder edge indicating determined locations of the road shoulder edge.

The information processing device 1 in the first embodiment is configured as described above. The functions of the information processing device 1 are realized by hardware illustrated in FIG. 12.

Figure 12:
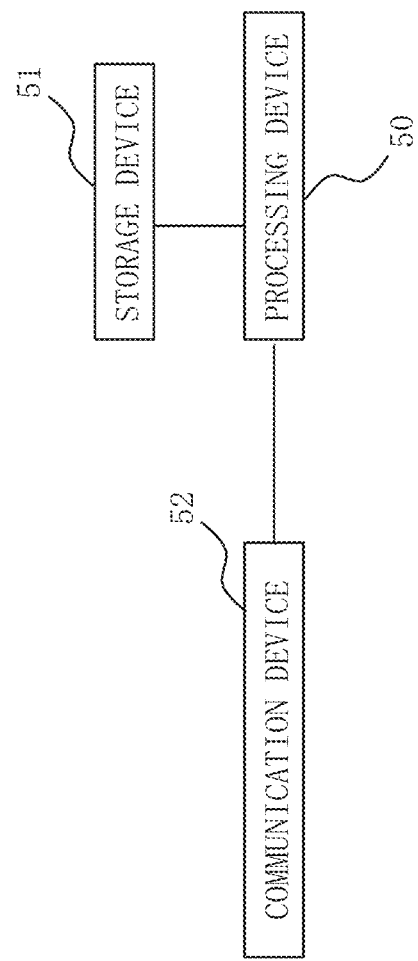
FIG. 12 is a configuration diagram illustrating a hardware configuration of the information processing device in the first embodiment.

The hardware illustrated in FIG. 12 includes a processing device 50 such as a central processing unit (CPU), a storage device 51 such as a read only memory (ROM) or a hard disk, and a communication device 52.

The information acquisition unit 2 illustrated in FIG. 1 is realized by the communication device 52, and the candidate location information generation unit 3, the selection unit 4, and the boundary location information generation unit 5 are realized by execution of programs stored in the storage device 51 by the processing device 50.

The information acquisition unit 2 may be configured such that the processing device 50 acquires feature measurement information and trajectory information that are stored in advance in the storage device 51, instead of using the communication device 52.

The method for realizing the functions of the information processing device 1 is not limited to a combination of hardware and software as described above, and the functions may be realized solely by hardware such as a large-scale integrated circuit (LSI), which is a processing device in which programs are implemented, or some of the functions may be realized by dedicated hardware and some of the functions may be realized by a combination of a processing device and programs.

The information processing device 1 in this embodiment is configured as described above.

Operation of the information processing device 1 in this embodiment will now be described.

Figure 13:
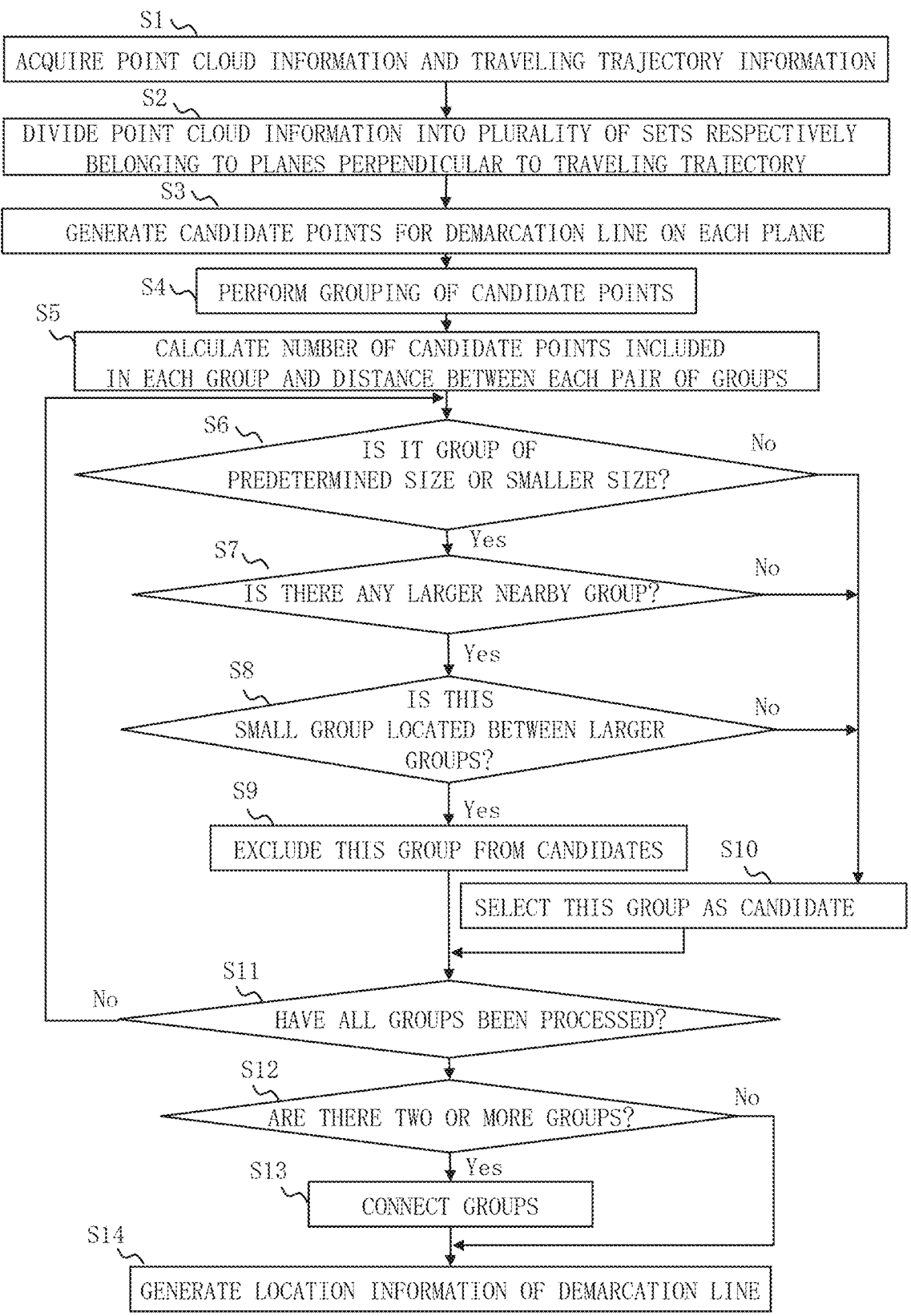
FIG. 13 is a flowchart illustrating operation relating to generation of location information of a demarcation line by the information processing device in the first embodiment.

First, operation when a demarcation line is plotted will be described using a flowchart of FIG. 13.

In step S1, the information acquisition unit 2 acquires, from an external server or the like, point cloud information measured by the mobile mapping system, as feature measurement information, and traveling trajectory information indicating a traveling trajectory of the surveying vehicle in which the mobile mapping system is installed when measuring the point cloud information, as trajectory information.

In step 2, the division unit 6 sets a plurality of planes perpendicular to the traveling trajectory of the surveying vehicle, based on the traveling trajectory information acquired by the information acquisition unit 2 in step S1, and divides the point cloud information acquired by the information acquisition unit 2 into sets respectively belonging to the planes that have been set.

In step S3, the divided-area candidate location information generation unit 7 generates candidate location information indicating locations of candidate points for the demarcation line, based on luminance level information included in point cloud information on each plane set by the division unit 6 in step S2.

In step S4, the selection unit 4 performs a grouping process and a group integration process as described above on the candidate points indicated by the candidate location information generated by the divided-area candidate location information generation unit 7 in step S3.

Then, in steps S5 to S11, the selection unit 4 performs a process of selecting groups of candidate points to be used for generating a boundary and excluding a group due to a disturbance factor such as a smudge on the road surface, from among the groups generated in step S4. In step S5, the number of candidate points included in each group and the distance between each pair of groups are calculated. Then, in steps S6 to S8, it is determined whether each group meets three conditions for being excluded from candidates to be used for generating location information of the demarcation line. In step S9, the group that meets all the three conditions is excluded. In step S10, the group that does not meet any of the conditions is selected as a candidate to be used for generating location information.

Specifically, in step S6, it is determined whether a target group includes only the predetermined number of candidate points or less, that is, whether it is a group of a predetermined size or smaller size. In step S7, it is determined whether there is a larger group near the target group. In step S8, it is determined whether the small target group is located between larger groups. In step S9, the group that meets all the conditions of steps S6 to S8 is excluded from candidates to be used for generating location information. In step S10, the group that does not meet any of the conditions is selected as a candidate to be used for generating location information.

In step S11, it is determined whether the process of steps S6 to S10 has been performed on all the groups. If the process has not been performed on all the groups, processing returns to step S6 and the process of steps S6 to S10 is performed on a next group.

If it is determined in step S11 that the above process has been performed on all the groups, processing proceeds to step S12.

In step S12, the boundary location information generation unit 5 determines whether there are two or more groups to be candidates for the demarcation line. If there are two or more groups, processing proceeds to step S13. If there is only one group, processing proceeds to step S14.

If the boundary location information generation unit 5 determines in step S12 that there are two or more groups to be candidates for the demarcation line, the boundary location information generation unit 5 connects groups in step S13. Specifically, the boundary location information generation unit 5 generates new candidate points for the demarcation line between two groups, based on the traveling trajectory. The new candidate points are generated such that an approximate curve formed by the candidate points is shaped similarly to the traveling trajectory.

As a result of the operation of steps S1 to S13 as described above, the candidate points for the demarcation line are obtained. Then, in step S14, the boundary location information generation unit 5 generates location information of the finally obtained candidate points for the demarcation line, as location information of the demarcation line indicating determined locations of the demarcation line. That is, in step S14, the boundary location information generation unit generates boundary location information indicating determined locations of the boundary, as a process of determining boundary location information to be finally output.

The demarcation line indicated by the location information generated by the operation as described above is generated by excluding disturbance factors such as smudges on the road, and thus is a smooth line corresponding to the traveling trajectory along the road, so that when it is used for map information, location information of the demarcation line that properly reflects the real demarcation line can be obtained.

Next, operation when a road shoulder edge is to be plotted will be described using a flowchart of FIG. 14.

The operation in steps S21 and S22 is substantially the same as that in steps S1 and S2, respectively, in plotting a demarcation line.

In step S21, the information acquisition unit 2 acquires point cloud information as feature measurement information and traveling trajectory information as trajectory information.

In step S22, the division unit 6 sets a plurality of planes perpendicular to the traveling trajectory of the surveying vehicle, based on the traveling trajectory information acquired by the information acquisition unit 2, and divides the point cloud information acquired by the information acquisition unit 2 into sets respectively belonging to the planes that have been set.

In step S23, the divided-area candidate location information generation unit 7 generates candidate location information indicating locations of candidate points for the road shoulder edge, based on height information included in the point cloud information on each plane set by the division unit in step S22.

In step S24, the selection unit 4 performs the grouping process described above on the candidate points indicated by the candidate location information generated by the divided-area candidate location information generation unit 7 in step S23. Since only one road shoulder edge is to be set on each of the right and left sides of the traveling trajectory, the selection unit 4 groups pairs of candidate points selected on the respective planes such that candidate points existing on the left side of the traveling trajectory are grouped together into one group and candidate points existing on the right side of the traveling trajectory are grouped together into another group different from the group of the left side.

Furthermore, the selection unit 4 excludes candidate points that are likely to cause irregularities in the road shoulder edge to be generated, in each group grouped in step S24. To do so, the selection unit 4 checks the distance between each candidate point and the traveling trajectory sequentially in order of the measurement time points included in the point cloud information, starting with a candidate point with the earliest time point and ending with a point with the latest time point, extracts candidate points with a sharp change in the distance to the traveling trajectory, treats the section between the extracted candidate points as an exclusion section, and excludes the candidate points in the exclusion section from the candidate points to be used for generating location information of the road shoulder edge. Specifically, the selection unit 4 performs the following steps S25 to S26. In step S25, the distance between each candidate point in the group and the traveling trajectory is calculated. Then, in step S26, an exclusion section is detected by comparing the distances calculated for each candidate point in step S25 between candidate points that are placed adjacent to each other when the candidate points are arranged in order of the measurement time points from the earliest to the latest. This detection of an exclusion section is performed as described below, for example.

With regard to a certain candidate point and two candidate points adjacent to and sandwiching this candidate point, it is determined whether a difference in the distance when compared with one of the adjacent candidate points and a difference in the distance when compared with the other adjacent candidate point are both equal to or greater than a predetermined threshold value. If both are not equal to or greater than the threshold value, this candidate point can be presumed to be a candidate point for a smooth road shoulder edge, so that it is kept as a candidate point in the group. If the difference in the distance is equal to or greater than the threshold value with regard to at least one of the two adjacent candidate points, this candidate point can be presumed to be the start point or end point of an exclusion section, so that it is treated as the start point or end point of the exclusion section. After making such determinations for all the candidate points in the group, the exclusion section corresponding to the candidate points 34 to 36 of FIG. 8 can be detected, based on the candidate points of the start point and end point of the exclusion section, a time series of measurement time points of the candidate points, the number of continuous candidate points with a difference in the distance equal to or less than the threshold value, or the like.

Then proceeding to step S27, the selection unit 4 excludes the candidate points included in the exclusion section detected in step S26 from the candidates to be used for generating location information of the road shoulder edge.

In step S28, the boundary location information generation unit 5 generates candidate points to interpolate the exclusion section excluded by the selection unit 4 in step S27. The specific method is substantially the same as the method by which two groups are connected when plotting a demarcation line, and new candidate points are generated such that an approximate curve formed by the candidate points, other than the excluded candidate points, and the newly generated candidate points is shaped similarly to the nearby traveling trajectory.

As a result of the operation of steps S21 to S28 as described above, the candidate points for the road shoulder edge are obtained. Then, in step S29, the boundary location information generation unit 5 generates location information of the finally obtained candidate points for the road shoulder edge, as location information of the road shoulder edge indicating determined locations of the road shoulder edge. That is, in step S29, the boundary location information generation unit generates boundary location information indicating determined locations of the boundary, as a process of determining boundary location information to be finally output.

The road shoulder edge indicated by the location information generated by the operation as described above is generated by eliminating disturbance factors such as smudges on the road surface, and thus is a smooth line corresponding to the traveling trajectory along the road. Therefore, when it is used for map information, location information of the road shoulder edge properly reflecting the real road shoulder edge can be obtained.

By the operation of the information processing device 1 as described above, when boundaries of a road such as a demarcation line and a road shoulder edge are to be plotted, candidate points corresponding to the traveling trajectory of the surveying vehicle traveling along the road are selected in the selection unit, and based on the selected candidate points, the boundary location information generation unit generates boundary information. As a result, it is possible to generate boundary location information of the road in which inaccuracies due to disturbance factors are reduced.

INDUSTRIAL APPLICABILITY

An information processing device according to the present invention is applicable to plotting of a dynamic map.

REFERENCE SIGNS LIST

1: information processing device, 2: information acquisition unit, 3: candidate location information generation unit, 4: selection unit, 5: location information generation unit, 6: division unit, 7: divided-area candidate location information generation unit, 8: point, 9: point, 10: candidate point, 11: threshold value, 12: point, 13: point, 14: point, 15: point, 16: candidate point, 17: threshold value, 18: point, 19: road surface, 20: candidate point, 21: approximate straight line, 22: candidate point, 23: candidate point, 24: candidate point, 25: candidate point, 26: traveling trajectory, 27: group, 28: group, 29: group, 30: group, 31: traveling trajectory, 32: candidate point, 33: candidate point, 34: candidate point, 35: candidate point, 36: candidate point, 37: traveling trajectory, 38: group, 39: group, 40: candidate point, 41: candidate point, 42: traveling trajectory, 43: candidate point, 44: candidate point, 45: candidate point, 46: candidate point, 47: road shoulder edge, 48: demarcation line, 49: deceleration line, 50: processing device, 51: storage device, 52: communication device

The invention claimed is:

1. An information processing device that generates boundary location information of a road on which a vehicle travels by automated driving, the information processing device comprising:
processing circuitry to:
acquire feature measurement information indicating locations of features including the road having a boundary and trajectory information indicating a trajectory along the road;
generate candidate location information indicating locations of candidate elements for the boundary, based on the acquired feature measurement information;
select candidate elements corresponding to the trajectory, based on the locations of the candidate elements indicated by the generated candidate location information and a distance to the trajectory indicated by the acquired trajectory information; and
generate boundary location information indicating determined locations of the boundary, using the selected candidate elements,
wherein the processing circuitry selects candidate elements corresponding to the trajectory, based further on a distance between each of the candidate elements indicated by the generated candidate location information,
wherein the processing circuitry sets a plurality of areas, divides the feature measurement information into sets respectively belonging to the plurality of areas, and generates the candidate location information, based on the feature measurement information in each area after being divided, wherein the plurality of areas into which the processing circuitry divides the feature measurement information are a plurality of spaces intersecting the trajectory indicated by the trajectory information; and control automated driving of the vehicle based on the boundary location information.

2. The information processing device according to claim 1,
wherein the acquired trajectory information is movement trajectory information indicating a movement trajectory of a mobile object moving along the road.

3. The information processing device according to claim 1,
wherein the processing circuitry acquires, as the feature measurement information, point cloud information indicating locations of surfaces of the features, and
generates candidate points for a road shoulder edge as the candidate elements for the boundary, based on the locations of the surfaces of the features indicated by the point cloud information, and generates the candidate location information including the locations of the candidate points.

4. The information processing device according to claim 1,
wherein the acquired feature measurement information includes measurement time point information indicating measurement time points at which the locations of the features are measured, and
wherein the plurality of areas into which the processing circuitry divides the feature measurement information are spaces corresponding to predetermined time intervals based on the measurement time point information.

5. The information processing device according to claim 1, wherein the processing circuitry is further configured to generate a road shoulder edge using only candidate points having a shorter distance to the traveling trajectory, wherein a vehicle travels without contacting the road shoulder even in a case that the vehicle travels by automated driving based on the generated road shoulder edge.

6. An information processing device that generates boundary location information of a road on which a vehicle travels by automated driving, the information processing device comprising:
processing circuitry to:
acquire feature measurement information, which is point cloud information indicating locations of surfaces of features including the road having a boundary and luminance levels of the features at the locations, and trajectory information indicating a trajectory along the road;
generate candidate location information indicating locations of candidate points for a demarcation line, as candidate elements for the boundary, based on the luminance levels of the features included in the point cloud information, which is the acquired feature measurement information;
select candidate elements from among the candidate elements indicated by the generated candidate location information, based on the acquired trajectory information;
generate boundary location information indicating determined locations of the boundary, using the selected candidate elements,
wherein the processing circuitry selects candidate elements corresponding to the trajectory, based further on a distance between each of the candidate elements indicated by the generated candidate location information,
wherein the processing circuitry sets a plurality of areas, divides the feature measurement information into sets respectively belonging to the plurality of areas, and generates the candidate location information, based on the feature measurement information in each area after being divided, wherein the plurality of areas into which the processing circuitry divides the feature measurement information are a plurality of spaces intersecting the trajectory indicated by the trajectory information, and control automated driving of the vehicle based on the boundary location information.

7. An information processing method that generates boundary location information of a road on which a vehicle travels by automated driving, the method comprising:

acquiring feature measurement information indicating locations of features including the road having a boundary and trajectory information indicating a trajectory along the road;

generating candidate location information indicating locations of candidate elements for the boundary, based on the acquired feature measurement information;

setting a plurality of areas, dividing the feature measurement information into sets respectively belonging to the plurality of areas, and generating the candidate location information, based on the feature measurement information in each area after being divided, wherein the plurality of areas are a plurality of spaces intersecting the trajectory indicated by the trajectory information;

selecting candidate elements corresponding to the trajectory, based on the locations of the candidate elements indicated by the generated candidate location information and a distance to the trajectory indicated by the acquired trajectory information;

generating boundary location information indicating determined locations of the boundary, using the selected candidate elements, wherein selecting the candidate elements corresponding to the trajectory is based further on a distance between each of the candidate elements indicated by the generated candidate location information; and controlling automated driving of the vehicle based on the boundary location information.

8. A non-transitory computer readable medium storing a program for causing a computer to execute the method recited in claim 7.

9. An information processing method that generates boundary location information of a road on which a vehicle travels by automated driving, the method comprising:

acquiring feature measurement information, which is point cloud information indicating locations of surfaces of features including the road having a boundary and luminance levels of the features at the locations, and trajectory information indicating a trajectory along the road;

generating candidate location information indicating locations of candidate points for a demarcation line, as candidate elements for the boundary, based on the luminance levels of the features included in the point cloud information, which is the acquired feature measurement information;

setting a plurality of areas, dividing the feature measurement information into sets respectively belonging to the plurality of areas, and generating the candidate location information, based on the feature measurement information in each area after being divided, wherein the plurality of areas are a plurality of spaces intersecting the trajectory indicated by the trajectory information;

selecting candidate elements from among the candidate elements indicated by the generated candidate location information, based on the acquired trajectory information; and generating boundary location information indicating determined locations of the boundary, using the selected candidate elements, wherein selecting the candidate elements corresponding to the trajectory is based further on a distance between each of the candidate elements indicated by the generated candidate location information; and controlling automated driving of the vehicle based on the boundary location information.

10. A non-transitory computer readable medium storing a program for causing a computer to execute the method recited in claim 9.

* * * * *